United States Patent
Jeretzky et al.

(10) Patent No.: US 10,493,748 B2
(45) Date of Patent: Dec. 3, 2019

(54) PROCESSING MACHINE HAVING A PLURALITY OF PROCESSING STATIONS FOR THE PROCESSING OF ARTICLES

(71) Applicant: Koenig & Bauer Kammann GmbH, Bad Oeynhausen (DE)

(72) Inventors: Gerald Jeretzky, Hüllhorst (DE); Volker Steffen, Herford (DE)

(73) Assignee: Koenig & Bauer Kammann GMBH, Bad Oeynhausen (DE)

( * ) Notice: Subject to any disclaimer, the term of this patent is extended or adjusted under 35 U.S.C. 154(b) by 0 days.

(21) Appl. No.: 16/316,728

(22) PCT Filed: Aug. 11, 2017

(86) PCT No.: PCT/EP2017/070443
§ 371 (c)(1),
(2) Date: Jan. 10, 2019

(87) PCT Pub. No.: WO2018/041604
PCT Pub. Date: Mar. 8, 2018

(65) Prior Publication Data
US 2019/0291405 A1 Sep. 26, 2019

(30) Foreign Application Priority Data

Sep. 1, 2016 (DE) .................. 10 2016 216 514
Sep. 13, 2016 (DE) .................. 10 2016 217 376

(51) Int. Cl.
*B41F 15/08* (2006.01)
*B41F 17/22* (2006.01)
(Continued)

(52) U.S. Cl.
CPC .......... *B41F 21/00* (2013.01); *B41F 15/0872* (2013.01); *B41F 15/18* (2013.01);
(Continued)

(58) Field of Classification Search
CPC ...... B41F 15/30; B41F 15/0872; B41F 15/32; B41F 17/002; B41F 17/18; B41F 17/22; B41F 21/00; B41F 33/16
See application file for complete search history.

(56) References Cited

U.S. PATENT DOCUMENTS

| 5,524,538 A | 6/1996 | Voge et al. |
| 9,211,755 B2 | 12/2015 | Vegelahn et al. |

(Continued)

FOREIGN PATENT DOCUMENTS

| DE | 3826830 A1 | 4/1989 |
| DE | 4328038 A1 | 2/1995 |

(Continued)

OTHER PUBLICATIONS

International Search Report of PCT/EP2017/070443 dated Nov. 9, 2017.

*Primary Examiner* — Matthew G Marini
(74) *Attorney, Agent, or Firm* — Mattingly & Malur, PC

(57) ABSTRACT

A processing machine is configured, in particular, as a printing machine and has a plurality of processing stations for the processing of typically hollow bodies. The processing stations for the processing of the bodies are arranged in an operating chamber each at different positions, in a state in which they are lined up in a row in the direction of transport of the bodies which are to be processed. The processing stations are arranged in the same horizontal plane in the operating chamber. A body which is to be processed, or which has been processed, is transported from one processing station to the next processing station beneath that horizontal plane in which the individual processing stations are arranged. A plurality of simultaneously operated, or simultaneously operable, handling devices are provided in the operating chamber. Each handling device is provided for transporting at least one body which is to be processed, or (Continued)

which has been processed. At least two of the handling devices, which are arranged in the same operating chamber and are simultaneously operated, or are at least simultaneously operable, are arranged in different horizontal planes arranged vertically one above the other and are each moved, or at least are capable of being moved, horizontally in the respective plane.

33 Claims, 2 Drawing Sheets

(51) Int. Cl.
*B41F 21/00* (2006.01)
*B41F 17/00* (2006.01)
*B41F 33/16* (2006.01)
*B41F 15/30* (2006.01)
*B41F 15/32* (2006.01)
*B41F 17/18* (2006.01)
*B41F 15/18* (2006.01)
*G05D 1/02* (2006.01)

(52) U.S. Cl.
CPC .............. *B41F 15/30* (2013.01); *B41F 15/32* (2013.01); *B41F 17/002* (2013.01); *B41F 17/006* (2013.01); *B41F 17/18* (2013.01); *B41F 17/22* (2013.01); *B41F 33/16* (2013.01); *B41F 15/0877* (2013.01); *G05D 1/0221* (2013.01); *G05D 2201/0216* (2013.01)

(56) References Cited

U.S. PATENT DOCUMENTS

| | | |
|---|---|---|
| 2011/0067584 A1 | 3/2011 | Mueller et al. |
| 2013/0295285 A1 | 11/2013 | Vegelahn et al. |

FOREIGN PATENT DOCUMENTS

| | | |
|---|---|---|
| DE | 4416974 A1 | 11/1995 |
| DE | 102010056123 B3 | 4/2012 |
| DE | 102013112091 A1 | 5/2015 |
| DE | 102015106238 A1 | 10/2016 |
| EP | 0425967 A2 | 5/1991 |
| EP | 2100733 A1 | 9/2009 |
| EP | 2995453 A1 | 3/2016 |

PROCESSING MACHINE HAVING A PLURALITY OF PROCESSING STATIONS FOR THE PROCESSING OF ARTICLES

CROSS REFERENCE TO RELATED APPLICATIONS

This application is the U.S. National Phase, under 35 U.S.C. § 371, of PCT/EP2017/070443, filed Aug. 11, 2017; published as WO 2018/041604 A1 on Mar. 8, 2018, and claiming priority to DE 10 2016 216 514.3, filed Sep. 1, 2016 and to DE 10 2016 217 376.6, filed Sep. 13, 2016, the disclosures of which are expressly incorporated herein by reference in their entireties.

FIELD OF THE INVENTION

The present invention relates to a processing machine having a plurality of processing stations for the processing of articles. The processing stations, which are provided for processing the articles, are arranged in a row, within a working space, in the transport direction of the articles to be processed, each at a different position from the other processing stations. The processing stations are located in the same horizontal plane within the working space. The transport of an article that has been or that is to be processed, from one processing station to the next, is carried out below the horizontal plane in which the individual processing stations are located.

BACKGROUND OF THE INVENTION

The term "article" is understood as a three-dimensional object which has mass and occupies space. Articles are composed of matter. Solids have a solid shape and can be described by boundary surfaces. The present invention relates primarily to a processing machine for processing articles that have rigid and/or inflexible boundary surfaces, preferably round articles and/or hollow articles, each having curved and/or rounded and/or convex boundary surfaces, in particular hollow articles to be used as containers, with the processing of said boundary surfaces consisting preferably in the decoration thereof, in particular in the printing thereof. Articles of this type are used, e.g. as packaging, in particular as primary packaging for a specified, i.e. predetermined volume of, e.g. a liquid or pasty or powdered packaged product, with the article in question at least partially, preferably fully enclosing the packaged product. Each of the articles to be processed by the processing machine is configured, e.g. as a bottle or as a flacon or as a can or as a canister or as a tube. The articles to be processed, which are manufactured, e.g. as integral or as multi-component articles, are each made partially or fully, e.g. of glass or a ceramic or a plastic or a metallic material.

EP 2 995 453 A1 discloses a transport device for transporting objects that are to be and have been processed in a processing machine, having a first conveying device and a second conveying device, a first conveyance path for these objects being rigidly predetermined with respect to the first conveying device and a second conveyance path being rigidly predetermined with respect to the second conveying device, wherein a transfer position of a transfer device, located in the second conveyance path of the second conveyance device, is provided for the transfer of objects from the first conveying device to the second conveying device and from the second conveying device to the first conveying device, and the second conveying device includes a holding device for holding one of the objects to be transported along the second conveyance path at a time, wherein objects moved by the first conveying device along the first conveyance path are moved continuously and the holding device of the second conveying device is moved discontinuously along the second conveyance path, wherein each of the objects to be transported is configured as a hollow article with a longitudinal axis, the respective longitudinal axis of each of the objects to be transported being arranged horizontally in the first conveyance path and in the second conveyance path.

EP 0 425 967 A2 discloses a screen printing method for printing onto objects that have at least one section with a non-round cross section, using a device that includes at least one holder for the object, arranged pivotably about an eccentric axis of the object, a screen printing stencil, and a doctor blade that is displaceable relative to said stencil, in which the holder for the object is moved into a first position and the object to be printed is likewise moved into a position that corresponds to the position of the holder, such that the longer cross-sectional axis of the section of the object to be printed extends substantially horizontally, and the object is picked up in this position by the holder, whereupon holder and object execute a first pivoting movement whereby holder and object are moved into a starting position in which a second pivoting movement begins, which is in opposition to the first pivoting movement, wherein at least during a portion of this second pivoting movement, the printing of the object takes place, and thus, when holder and object reach their end position at the end of the second pivoting movement, they execute a third pivoting movement in the direction of the first pivoting movement, such that at the end of the third pivoting movement, holder and object are back in the first position, in which the printed object is then removed from the holder.

DE 43 28 038 A1 discloses a web-fed printing machine having at least one printing unit and at least one roll changer for flying roll changes, in which roll changer a first roll containing a first material web is unwound for printing and is exchanged for a second roll containing a second wound material web, wherein the roll changer has a cutting and splicing device for connecting the beginning of the second wound material web to the end of the expiring wound material web, the first roll is mounted on a first driverless transport vehicle and the second roll is mounted on a second driverless transport vehicle, and the transport vehicles receive the rolls, which have been prepared for the splicing process by being provided with an adhesive pattern, in a preparation station.

DE 10 2015 106 238 A1, which was post-published, discloses an accumulating conveyor with a stationary guide means and with a number of workpiece carriers, wherein a drive and at least one engagement means, which is associated with said drive and is engaged with the guide means, is provided on each workpiece carrier, and the engagement means driven by the drive moves with the workpiece carrier along the guide means.

DE 38 26 830 A1 discloses a linear transfer device for workpiece carriers, having at least one guide rail, on which the workpiece carrier having an essentially U-shaped cross-section is guided via guide elements engaged in a positive-locking manner with the guide rail, the guide rail having an energy supply section on which the workpiece carrier engages by means of a power line, and a drive section on which a drive element borne by the workpiece carrier engages, which drive element is driven by a drive motor arranged in the workpiece carrier and supplied with power via the power line, and a control system for the drive of the workpiece carrier being provided, which has at least one switching element arranged on the end of the workpiece carrier, via which switching element the drive motor can be shut down when the switching element is actuated by one of the workpiece carriers following on the guide rail.

DE 10 2013 112 091 A1 discloses a device for placing objects on a processing machine configured as a continuously rotating carousel having processing stations arranged distributed around its periphery, and/or for removing objects from such a processing machine, said device having multiple transport devices, each for transporting an object from a first transfer position to a second transfer position and a receiving device for receiving said object at the first transfer position and for delivering said object to the second transfer position, each of the transport devices being guided on a revolving transport guide and being movable by a drive, independently of the other transport devices being guided on the revolving transport guide.

EP 2 100 733 A1 discloses a linear printing machine having interchangeable printing modules for printing on hollow articles, comprising: a) a transport system having a drive, with which the hollow articles to be printed on are transported through the linear printing machine, b) at least a first printing station and a second printing station, which is located downstream of the first printing station in the direction of conveyance of the hollow articles, c) at least one drying station for drying the ink on the printed hollow articles, and d) a machine controller which controls at least the transport of the hollow articles through the linear printing machine, e) wherein each of the printing stations is set up to accommodate a printing module having its own drive, and wherein the printing module can be connected to the machine controller via an interface, f) wherein the printing modules print on the hollow articles using a printing method selected from the following: screen printing and/or flexographic printing and/or offset printing and/or cold embossing and/or hot embossing and/or laser color transfer and/or inkjet printing.

SUMMARY OF THE INVENTION

The object of the present invention is to devise a processing machine having a plurality of processing stations for the processing of articles.

The object is attained according to the invention by the provision of a plurality of handling systems which operate simultaneously or which at least, can be operated simultaneously within the working space. Each handling system is provided for transporting at least one article that has been or that is to be processed. At least two of the handling systems, located within the same working space, which are operated simultaneously or at least which can be operated simultaneously, are located in different, vertically superimposed, horizontal planes, each handling system being moved or at least being movable horizontally within its respective plane.

The advantages to be achieved with the invention are in particular that a processing machine having a plurality of processing stations for processing articles is created, which offers high productivity. With the proposed solution, the mass throughput of articles processed in said processing machine is increased significantly, without any loss of flexibility in terms of the sequence of processing steps to be carried out in a given processing procedure. Additional advantages will be apparent in the following description.

BRIEF DESCRIPTION OF THE DRAWINGS

One exemplary embodiment of the invention is illustrated in the set of drawings and will be described in greater detail below.

In the drawings.

DESCRIPTION OF THE PREFERRED EMBODIMENTS

Figure 1:
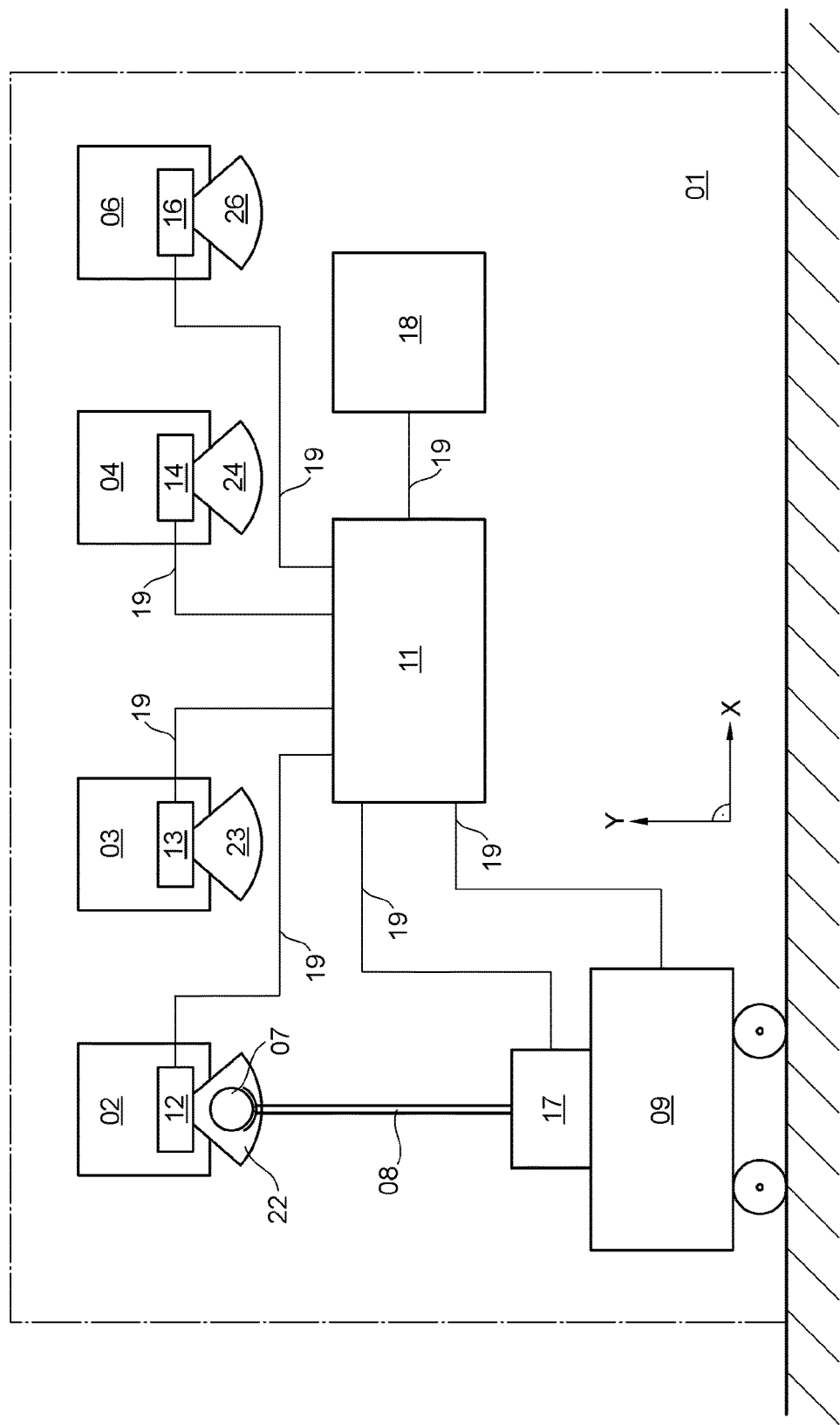
FIG. 1 shows a processing machine having one handling system.

FIG. 1 shows a highly simplified example of a processing machine having a plurality of processing stations 02; 03; 04; 06 for processing articles 07, e.g. four or six or eight or more such processing stations, each of which is fixedly positioned within a working space 01, which is rectangular, for example. The articles 07 to be processed are preferably fed automatically, e.g. by means of a first conveying device, into said working space 01, which is bounded, e.g. by an enclosure, and once they have been processed said articles are preferably removed again automatically, e.g. by means of a second conveying device, or said articles at least can be fed into and removed from the working space 01 of the processing machine in this way. The working space 01 is thus the space in the processing machine in which the individual processing stations 02; 03; 04; 06 for processing the articles 07 are located and in which the articles 07 introduced into this space are processed. The processing stations 02; 03; 04; 06 provided for processing the articles 07 are typically arranged within the working space 01 of the processing machine, indicated in FIG. 1 by a border, each at a position, e.g. a steplessly selectable position, which is preferably permanently defined based upon the choice of said processing machine for performing a specific processing procedure. The respective positions of the processing stations 02; 03; 04; 06 provided for processing the articles 07 in the certain processing procedure are different from one another and are thus spaced apart from one another. The processing stations 02; 03; 04; 06 are arranged in a row, in particular one behind the other in a line, in the direction of transport of the articles 07 to be processed, said direction of transport of the articles 07 to be processed leading substantially from a transfer station located in the area where the articles 07 to be processed are transferred from the first conveying device into the working space 01 to a transfer station located in the area where the processed articles 07 are transferred from the working space 01 to the second conveying device. The processing stations 02; 03; 04; 06 are arranged within the same horizontal plane in the working space 01. The processing stations 02; 03; 04; 06 are, e.g. variable in width in the direction of transport of the articles 07 to be processed. Although each of the processing stations 02; 03; 04; 06 is typically positioned fixedly within the working space 01 of the processing machine, they can each be exchanged at their respective positions for a different type of processing station 02; 03; 04; 06 and/or their respective positions can be adjusted and/or corrected as required within defined limits, enabling the processing machine to be used flexibly and/or optimized for different processing procedures. A varying number of processing stations 02; 03; 04; 06 may be used in the working space 01 of the processing machine, dependent upon the processing procedure in use. During the execution of a certain processing procedure, each of the positions provided for a processing station 02; 03; 04; 06 in working space 01 of the processing machine may be equipped with or occupied by a processing station 02; 03; 04; 06; however, it is not necessary for all of said processing stations 02; 03; 04; 06 to be used in that specific processing procedure; depending upon the requirements of the specific processing procedure, it is possible for only a selection of the existing processing stations 02; 03; 04; 06 to be used. In that case, articles 07 to be processed will be fed only to those processing stations 02; 03; 04; 06 that are selected based upon the specific processing procedure.

In a preferred embodiment of the invention, the processing machine is configured as a printing machine or the processing machine is equipped with at least one printing machine, each of a plurality of processing stations 02; 03; 04; 06 being configured as a printing unit. Each of these printing units is configured such that an article 07 fed to it is or at least can be printed on by it, e.g. in a screen printing process or in a plateless printing process, i.e. in a digital printing process. An inkjet printing unit or a laser, for example, is used to carry out the digital printing process.

The processing machine typically processes multiple articles, usually a large quantity, e.g. several thousand identical articles 07 in a single processing procedure, with each article 07 being processed in the processing procedure intended for it on its outer surface, in particular. For example, each of the articles 07 is imprinted, in particular on its lateral surface, with a preferably multicolored printed image. At least two of the plurality of processing stations 02; 03; 04; 06 located in the working space 01 are involved in the processing procedure intended for the article 07, which is determined, e.g. by selection or some other specification method, with the respective processing procedure defining which of the processing stations 02; 03; 04; 06 present within the working space 01 of the processing machine are to process the article 07 in question, and the sequence in which the respective processing stations 02; 03; 04; 06 are to process said article.

The processing machine is preferably configured such that it can be used to carry out various processing procedures that can be selected or specified, each of these possible processing procedures being defined by the processing stations 02; 03; 04; 06 that are or will be used and by the sequence in which they are used. At least one of the processing stations 02; 03; 04; 06 may be configured as a system for pre-processing or post-processing the respective articles 07, e.g. as a coating unit or as a dryer for drying a printing ink, in particular as a UV dryer, or as a flame treatment system for heating an article 07 to be processed. The selection or specification of the processing stations 02; 03; 04; 06 that are required for the certain processing procedure is made, for example, by an entry into or in conjunction with a control system 11. This control system 11 is configured, e.g. as an electronic, preferably digital, in particular freely programmable computing unit, in particular having at least one microprocessor. The selection of processing stations 02; 03; 04; 06 made dependent upon the processing procedure to be carried out reduces the number of processing stations 02; 03; 04; 06 to be used, e.g. to a subset of the plurality of processing stations 02; 03; 04; 06 located within the same working space 01. Control system 11 is preferably used for the exchange of data, e.g. with a production planning system 21, also referred to as a PPS; the processing procedure to be carried out is specified to the control system 11 by the production planning system 21. A PPS is a computer program or a system of computer programs that assists the user in production planning and production control and manages the data associated with these. The aims of a PPS include the realization of short throughput times, adherence to schedules, optimal inventory levels and the efficient use of resources, i.e. in this case the processing machine with its processing stations 02; 03; 04; 06. Since PPS's are not typically provided for the direct control of production and production systems such as the processing machine with its processing stations 02; 03; 04; 06, for example, a production control panel which in this case includes, e.g. control system 11 is provided for the control of production operations, to enable each of the production units and/or production systems, here in the form of processing stations 02; 03; 04; 06, to be controlled. The production control panel, i.e. control system 11, receives production orders from the PPS, typically via an interface, and these production orders in turn form target data. The production results that are achieved form actual data, which are recorded e.g. by means of a production data recording device and are reported back to the PPS; the PPS then takes these actual data into account in the next planning cycle. This allows a corresponding control loop to be established for production control.

For feeding a plurality of articles 07 to be processed, which have been supplied to the working space 01 of the processing machine, individually and in succession to a processing station 02; 03; 04; 06 required according to the designated processing procedure, and for transporting said articles from one processing station 02; 03; 04; 06 to the next, a plurality of handling systems 08 are provided according to the invention. The relevant handling system 08 which is provided for the transport of articles 07 that will be or have been processed has at least one drive 09, e.g. electric or pneumatic, and said at least one drive 09 is or at least can be controlled by control system 11. The relevant handling system 08 is or is to be moved, preferably in a translatory manner, by means of its at least one drive 09 dependent upon control data output by the control system 11, along a path of movement from a first processing station 02; 03; 04; 06 for processing the respective article 07 to at least one subsequent processing station 02; 03; 04; 06 for processing this same article 07, the movement path of said handling system 08 preferably being rectilinear. The path of movement of the relevant handling system 08 provided for transporting the processed article 07 or the article to be processed is defined, for example, by at least one, in particular linear rail system and/or is preferably disposed within a vertical transport plane, and the vertical transport plane which includes the movement path of the handling system 08 in question is disposed in each case lengthwise relative to the positions of the processing stations 02; 03; 04; 06 provided for processing the articles 07. Said handling system 08 is preferably configured as a bidirectionally movable, two-axis system, i.e. said handling system 08 has two axes of movement generally arranged orthogonally to one another, wherein the two-axis system feeds the article 07 in question, which has been or will be processed, within the vertical transport plane starting, e.g. from a transfer station located in the area where the article 07 to be processed is transferred from the first conveying device into the working space 01, to the respective processing station 02; 03; 04; 06 determined by the selected processing procedure, and then delivers the article 07 processed at the processing station 02; 03; 04; 06 in question from said processing station 02; 03; 04; 06, e.g. to the transfer station located in the area where the processed article 07 will be transferred from working space 01 to the second conveying device. The movements that are or at least can be carried out by the handling system 08 in question within the vertical transport plane are indicated in the figures by the directions of movement X and Y, e.g. located within a Cartesian system of coordinates. Each article 07 to be processed preferably is or at least can be advanced from below, i.e. from a vertically lower position, to the processing station 02; 03; 04; 06 in question, which is disposed at a vertically higher position than the handling system 08 in question, e.g. to a screen printing unit or to a digital printing unit. The transport of an article 07 that has been or is to be processed from one processing station 02; 03; 04; 06 to the next is preferably carried out below the horizontal plane in which the individual processing stations 02; 03; 04; 06 are located, in particular arranged in a row.

To increase the mass throughput through this processing machine, i.e. to increase its output volume and/or to utilize the processing stations 02; 03; 04; 06 more efficiently, a plurality of handling systems 08, e.g. at least two or three, are provided in the working space 01 of the processing machine (FIG. 2), and preferably are operated simultaneously or at least can be operated simultaneously along their respective paths of movement, with each of these paths of movement preferably extending within a respective transport plane, and with the transport planes of these handling systems 08 being arranged together with the processing stations 02; 03; 04; 06 within the same working space 01. These multiple handling systems 08 are substantially identical in structure, for example, i.e. fitted with the same components. To ensure that this plurality of handling systems 08 operates simultaneously within the working space 01 of the processing machine without collisions occurring among the handling systems or between the handling systems and the processing stations 02; 03; 04; 06, it is provided that the respective drives 09 of these simultaneously operated handling systems 08 are each controlled on the basis of control data provided by the control system 11, in particular control data output to said drives 09, with these control data causing the respective handling system 08 to move, preferably in a translatory manner, along at least one path of movement, i.e. these control data defining a movement of the respective handling system 08 along a specific path of movement; movements executed along these paths of movement by this plurality of handling systems 08 located within the same working space 01 are collision-free as a result of their programming. Collision-free means that a handling system 08 moved within working space 01 is never located at the same position as another handling system 08 moved within the same working space 01 or at the same position as one of the processing stations 02; 03; 04; 06 located within the same working space 01. The protection against collision of the plurality of handling systems 08 that are located within the same working space 01 and are operated simultaneously is therefore realized not by means of hardware, e.g. by using sensors that are connected to and communicate with control system 11, but by a corresponding drive control, i.e. by corresponding control data output by control system 11. The control data for the drives 09 of the respective handling systems 08 are selected such that the handling systems 08 involved in the execution of a certain processing procedure are prevented from occupying the same position within the working space 01 at the same point in time. Early collision detection and/or collision prevention is enabled and also realized by a corresponding programming of the movement sequences stored in control system 11, i.e. by means of corresponding control data. Furthermore, a protection against collision, implemented by the drive control, of the plurality of handling systems 08 arranged within the same working space 01 and operated simultaneously has the advantage that the respective movements of this plurality of handling systems 08 located within the same working space 01 to be executed along their paths of movement can be and/or are optimized in terms of mass throughput and/or in terms of a low-vibration and/or smoothly running execution by means of a program, in particular taking into account the specified processing procedure, e.g. specified by the production planning system 21, or dependent upon said processing procedure. Such an optimization which is carried out systematically in the control system 11, preferably in an automated manner, e.g. by means of mathematical procedures, factors in e.g. a phase shift between cyclically executed movement sequences of different handling systems 08 and/or waiting times and/or acceleration times or deceleration times within the movement sequences of the handling systems 08 involved in the processing procedure. The respective movements of this plurality of handling systems 08 located within the same working space 01, to be executed along the paths of movement of said handling systems, are then controlled by the control system 11, in each case factoring in a phase shift between cyclically executed movement sequences of different handling systems 08 and/or waiting times and/or acceleration times or deceleration times within these movement sequences of the handling systems 08 involved in the processing procedure.

Figure 2:
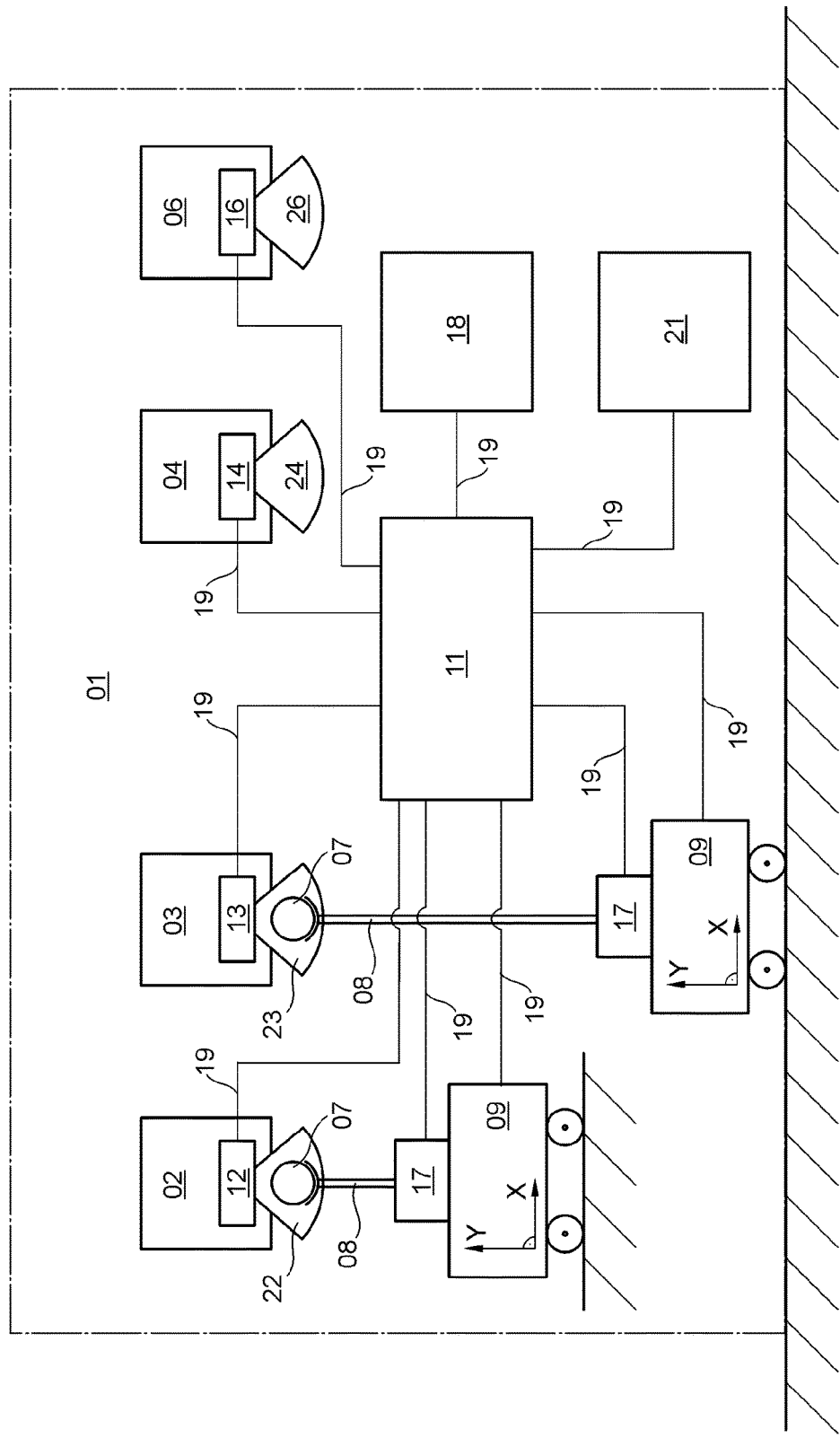
FIG. 2 shows a processing machine having two handling systems.

FIG. 2 shows an example of a processing machine having a plurality of handling systems 08, in this case, e.g. two, located within the same working space 01 and operated or at least operable simultaneously, these two handling systems 08 being located, e.g. in two different horizontal planes that are arranged vertically one above the other and are thus spaced apart from one another, and each being moved or at least movable horizontally, in particular bidirectionally, within its respective plane, along a rail system. These handling systems 08, each of which is again preferably configured as a two-axis system, each include, e.g. a lifting device with which the article 07 transported by the respective handling system 08 is or at least can be fed by a vertical movement to the respective processing station 02; 03; 04; 06. Of course, the respective handling system 08 is also used to remove an article 07 that has been processed at a processing station 02; 03; 04; 06 from said station, e.g. by lowering the lifting device, and then to transport said article in the X-direction by a horizontal movement, in particular along a horizontal linear guide, e.g. to the next processing station 02; 03; 04; 06. The lifting device of the respective handling system 08 therefore acts in the Y-direction in particular along a vertical linear guide. The movements of the respective handling system 08 in the X-direction and in the Y-direction are or at least can be executed in succession, or preferably are or at least can be executed simultaneously. The programming stored in control system 11 for the movement sequences of these two handling systems 08 specifies, e.g., that when there is risk of a collision, or in order to avoid collision, the handling system 08 located in the lower of the two vertically superimposed planes, i.e. in particular the lifting device thereof, moves or is moved into a safe lower position, based upon the control data controlling the at least one drive 09 thereof, thereby opening up a path for horizontal movement of the handling system 08 which is located in the upper of the two vertically superimposed planes, which path intersects the movement path of the handling system 08 which is located in the lower of the two vertically superimposed planes. Each respective handling system 08, in particular the lifting device thereof, is equipped, e.g. with a device for receiving the respective article 07 to be processed, said receiving device being configured, e.g., as format-variable, making it adaptable to articles 07 of different geometric shapes.

In a further embodiment of a processing machine having a plurality of handling systems 08, it may be provided that the respective operating zone of each of these handling systems 08 does not intersect or overlap spatially with the respective operating zone of any of the other handling systems 08. The operating zones of each of the handling systems 08 involved in the specified processing procedure are thus separated from one another spatially. In this case, e.g. at least one transfer station is provided between adjacent handling systems 08, and an article 07 that has been or will be processed is or at least can be transferred at the relevant transfer station from one handling system 08 to the next.

To further increase the mass throughput through a processing machine of this type, i.e. to further increase its output volume and/or to utilize the processing stations 02; 03; 04; 06 more efficiently, in one advantageous embodiment of the invention a plurality of vertical transport planes are arranged in the processing machine, each parallel to the others and each spaced horizontally from the others, with at least one handling system 08 being situated in each of these vertical transport planes. The handling systems 08 operating in different vertical transport planes preferably are or at least can be operated independently of one another.

The relevant handling system 08 is embodied, e.g., as a robot, in particular an industrial robot, which can be moved, in particular along at least one linear guide, by means of the relevant drive 09. In transporting the articles 07 to be processed, the handling system 08 in question effects in the processing machine a flow of material along those processing stations 02; 03; 04; 06 that are required for a particular processing procedure. In addition to transport, the relevant handling system 08 performs the function of providing the article to be processed 07 in a defined pose and/or orientation at the respective processing station 02; 03; 04; 06 and/or holding it there during the execution of the specific processing operation. The relevant handling system 08 performs each of its respective functions under program control. The respective handling system 08 is therefore connected to the control system 11 at least with respect to data communication, with the control system 11 controlling the respective functions of the handling system 08 in question.

Processing stations 02; 03; 04; 06 that are provided for processing an article 07 transported by a relevant handling system 08 each have at least one proximity sensor 12; 13; 14; 16, each proximity sensor having a detection zone 22; 23; 24; 26 that projects into the movement path of the handling system 08 in question. A proximity sensor 12; 13; 14; 16, also referred to as a proximity initiator, is a sensor that reacts to the approach of an object (in this case preferably an article 07 and/or the relevant handling system 08 and/or the relevant drive 09 of the respective handling system 08) toward said proximity sensor 12; 13; 14; 16, with the reaction of said sensor taking place without direct contact between the object and the proximity sensor 12; 13; 14; 16, i.e. in a contact-free manner. Proximity sensors 12; 13; 14; 16 are used to detect the position of objects, for example. The detection or recognition of the approach of an object toward the proximity sensor 12; 13; 14; 16 is based, e.g. on an inductive or capacitive or magnetic or optical or ultrasound-based operating principle. In particular, if the processing station 02; 03; 04; 06 in question is configured, e.g. as variable in width in the direction of transport of the articles 07 to be processed, i.e. if said processing station is preferably infinitely variable in its respective width extending in the direction of transport of the articles 07 to be processed, a plurality of proximity sensors 12; 13; 14; 16 are provided in conjunction with the processing station 02; 03; 04; 06 in question, in order to mark, e.g. the beginning or end of said processing station 02; 03; 04; 06 along its width.

The relevant handling system 08 intended for transport of the article 07 to be processed is equipped with an absolute encoder 17, which indicates the position of said handling system 08 with respect to its path of movement. An absolute encoder 17 is a device for measuring length or angle which is used as a position encoder. The absolute measurement supplied by an absolute encoder 17 is available without referencing as soon as the absolute encoder 17 is switched on. An absolute encoder 17 outputs position information or a position-related value in the form of a digital numerical value. Since this numerical value is unique over the entire resolution range of the absolute encoder 17, no initial reference run is required. The determination of the current position information is based, e.g. on an inductive or capacitive or magnetic or optical operating principle.

The at least one proximity sensor 12; 13; 14; 16 of the respective processing station 02; 03; 04; 06 and the absolute encoder 17 of the respective handling system 08, along with the respective drive 09 of the respective handling system 08, are each connected at least in terms of data communication to the control system 11, either wirelessly or in a wired connection via a line system 19, e.g. via a line system 19 configured as a data bus system, with the control system 11 generally having a preferably digital storage device 18.

The processing machine has at least two operating modes, specifically at least one teach-in phase and one production phase. In a first operating mode of the processing machine, i.e. in its teach-in phase, it is provided that the storage device 18 stores the position-related value, indicated in particular by the respective absolute encoder 17 with respect to the path of movement of the relevant handling system 08 intended for the transport of the article 07 to be processed, in each case dependent upon a certain processing procedure intended for the respective article or articles 07, when said handling system 08 is located, i.e. is disposed, within the detection zone 22; 23; 24; 26 of the relevant proximity sensor 12; 13; 14; 16 of the processing station 02; 03; 04; 06 that includes this proximity sensor 12; 13; 14; 16. When the processing machine is in its first operating mode, a calibration run is performed for the handling system 08 in question which is intended for transport of the article 07 to be processed. The processing machine is prepared for a certain processing procedure with the aid of the calibration run and is configured for the relevant processing procedure based upon the position-related values calculated, in particular by means of the respective absolute encoder 17, during the calibration run. Upon completion of the teach-in phase, the processing machine preferably switches automatically to its second operating mode, i.e. to its production phase, and is then capable of executing the functions of its second operating mode.

In the second operating mode of the processing machine, the relevant drive 09 of the handling system 08 in question is controlled by control system 11 in such a way that said handling system 08 assumes in succession the positions with respect to the path of movement of said handling system 08 that are stored in storage device 18 during the first operating mode of the processing machine, dependent upon the particular processing procedure intended for the respective article or articles 07. This second operating mode of the processing machine corresponds to a production phase for said processing machine, in which the handling system 08 in question advances to each of the previously stored and thus taught-in positions in succession, in each case dependent upon the particular processing procedure intended for the respective article or articles 07, and the respective article or articles 07 is/are processed in the processing station 02; 03; 04; 06 in question.

To increase the positioning accuracy of the relevant handling system 08, it is provided that during the first operating mode of the processing machine, i.e. during the teach-in phase, the handling system 08 in question advances multiple times to each processing station 02; 03; 04; 06 that is required for a particular processing procedure intended for the respective article 07, and that when said handling system 08 is situated within the detection zone 22; 23; 24; 26 of the relevant proximity sensor 12; 13; 14; 16 of the processing station 02; 03; 04; 06 that includes this proximity sensor 12; 13; 14; 16, the respective position-related value indicated with respect to the path of movement of the relevant handling system 08 intended for transport of the article 07 to be processed is stored in the storage device 18. The advance to the same processing station 02; 03; 04; 06 multiple times, e.g. twice, is carried out, e.g. during the back and forth movement of the handling system 08 in question along its specified path of movement. To calculate the position-related value to be used during the second operating mode of the processing machine, i.e. during the production phase of said processing machine, it is provided that the control system 11 calculates, e.g. the arithmetic mean value of the position-related values detected for a specific processing station 02; 03; 04; 06 and then uses this mean value to control the at least one drive 09 of the respective handling system 08 and thus to adjust the respective handling system 08 in the second operating mode of the processing machine 02; 03; 04; 06 to the position belonging to that specific processing station 02; 03; 04; 06.

Since it is provided that the storage device 18 stores the position-related value indicated by the respective absolute encoder 17 with respect to the path of movement of the handling system 08 in question intended for transport of the article 07 to be processed, in each case dependent upon a particular processing procedure intended for the respective articles 07, the control system 11 can verify, e.g. by comparing the current production run with previous identical production runs, whether the processing stations 02; 03; 04; 06 that are required to carry out the specified processing procedure are present and correct, i.e. installed at the correct position, for example.

In one advantageous refinement of the identified solution, each of the processing stations 02; 03; 04; 06 is equipped with an automatically readable identifier, e.g. an RFID. When a handling system 08 is located within the detection zone 22; 23; 24; 26 of the relevant proximity sensor 12; 13; 14; 16 of the processing station 02; 03; 04; 06 that includes said proximity sensor 12; 13; 14; 16, it may be provided that the relevant processing station 02; 03; 04; 06 having the identifier is identified, e.g. with respect to the handling system 08, and transmits technical information relating to its function and/or its performance data, either directly or via said handling system 08, to the control system 11, so that this technical information can be stored in the storage device 18, in each case together with the detected position-related value. Such additionally provided technical information may be, for example, "screen printing unit—240 mm wide" or "digital printing unit—80 mm wide—cyan ink". Using this additionally provided technical information, the specified processing procedure can be monitored even more closely.

If multiple handling systems 08, in particular handling systems that operate simultaneously, are located in the processing machine, it is preferably provided that each of these handling systems 08 performs a calibration run, e.g. independently of the others, prior to its respective production phase.

It is additionally provided, for example, that control system 11 evaluates the position-related values stored in storage device 18 for different processing stations 02; 03; 04; 06, optionally in conjunction with additional technical information, in order to output, e.g. on a display means connected to the control system 11, a recommendation for the optimized positioning of the processing stations 02; 03; 04; 06 within the working space 01 and/or for the sequence of use of said stations with regard to a specific processing procedure intended for the respective article 07.

It may be provided that at least one of the processing stations 02; 03; 04; 06 is equipped with one positioning means each, and the respective positioning means is or at least can be used to adjust the position of the processing station 02; 03; 04; 06 in question automatically, i.e. in particular controlled via control system 11, in particular for the purpose of optimizing performance for a specific processing procedure.

While a preferred embodiment of a processing machine having a plurality of processing stations for the processing of articles, in accordance with the present invention, has been set forth fully and completely hereinabove, it will be apparent to one of skill in the art that various changes could be made thereto, without departing from the true spirit and scope of the present invention, which is accordingly to be limited only by the appended claims.

The invention claimed is:

1. A processing machine having a plurality of processing stations (02; 03; 04; 06) for the processing of articles (07), wherein the processing stations (02; 03; 04; 06) provided for processing the articles (07) are arranged in a row within a working space (01) in the transport direction of the articles (07) to be processed, each at a different position from the other processing stations, wherein the position of each said processing station (02; 03; 04; 06) is adjusted for the performance of a particular processing procedure, wherein the respective positions of the processing stations (02; 03; 04; 06), each of which is adjusted for the performance of a particular processing procedure by said processing station, are located in the same horizontal plane within the working space (01), wherein the transport of an article (07) that has been or is to be processed from one processing station (02; 03; 04; 06) to the next is carried out below the horizontal plane in which the respective positions of the individual processing stations (02; 03; 04; 06) are located, each of which is adjusted for the performance of the processing procedure specific to said station, wherein a plurality of handling systems (08) that are operated simultaneously or at least can be operated simultaneously are provided within the working space (01), wherein each handling system (08) is provided for transporting at least one article (07) that has been or is to be processed, wherein at least two of the handling systems (08) located within the same working space (01), which are operated simultaneously or at least can be operated simultaneously, are located in different, vertically superimposed horizontal planes, each handling system being moved or at least movable horizontally within its respective plane, characterized in that each of the handling systems (08) is or at least can be moved horizontally within its respective plane along a rail system, wherein the path of movement of the handling system (08) in question provided for transporting the article (07) that has been or is to be processed is located in a vertical transport plane, wherein the vertical transport plane that contains the path of movement of said handling system (08) is disposed lengthwise relative to the positions of the processing stations (02; 03; 04; 06) provided for processing the articles (07).

2. The processing machine according to claim 1, characterized in that each article (07) to be processed is or at least can be advanced from a vertically lower position to the processing station (02; 03; 04; 06) in question, which is disposed at a vertically higher position than the handling system (08) in question.

3. The processing machine according to claim 2, characterized in that to avoid a collision, the handling system (08) located in a lower of the vertically superimposed planes, and/or the lifting device thereof, is moved into a safe lower position, thereby opening up a path for horizontal movement of the handling system (08) located in the upper of the vertically superimposed planes, which path of movement intersects the path of movement of the handling system (08) located in the lower of the vertically superimposed planes.

4. The processing machine according to claim 1, characterized in that each of the processing stations (02; 03; 04; 06) is arranged fixed in place within the working space (01).

5. The processing machine according to claim 1, characterized in that the working space (01) is enclosed.

6. The processing machine according to claim 1, characterized in that each of a plurality of processing stations (02; 03; 04; 06) is configured as a printing unit, wherein these printing units are configured such that with them, each article (07) fed to them is or at least can be printed in a screen printing process or in a plateless printing process.

7. The processing machine according to claim 1, characterized in that at least one of the processing stations (02; 03; 04; 06) is configured as a system for pre-processing or post-processing the respective articles (07), in the form of a coating unit or a dryer, in particular a UV dryer, or a flame treatment system.

8. The processing machine according to claim 1, characterized in that each of the processing stations (02; 03; 04; 06) located within the working space (01) can be exchanged at its respective position for a different type of processing station (02; 03; 04; 06).

9. The processing machine according to claim 1, characterized in that the handling systems (08) located within the same working space (01) and operated simultaneously are each bidirectionally movable.

10. The processing machine according to claim 1, characterized in that the handling systems (08) located within the same working space (01) and operated simultaneously each include a lifting device, with which the article (07) being transported by the respective handling system (08) is or at least can be fed to the respective processing station (02; 03; 04; 06) by way of a vertical movement.

11. The processing machine according to claim 1, characterized in that each respective handling system (08) or the lifting device thereof is equipped with a receiving device for receiving the respective article (07) to be processed, wherein said receiving device is configured as format-variable, and thus capable of receiving articles (07) of different geometric shapes.

12. The processing machine according to claim 1, characterized in that a control system (11) is provided.

13. The processing machine according to claim 12, characterized in that each of the processing stations (02; 03; 04; 06) located within the working space (01) is located at a steplessly selectable position, wherein at least one of the processing stations (02; 03; 04; 06) located within the working space (01) is or at least can be adjusted by means of a positioning means controlled via the control system (11).

14. The processing machine according to claim 12, characterized in that each of the handling systems (08) has at least one drive (09), which is controlled via the control system (11) on the basis of control data, wherein these control data are used to specify the movement of the respective handling system (08) along at least one translatory path of movement.

15. The processing machine according to claim 14, characterized in that at least one path of movement of said handling system (08) is rectilinear.

16. The processing machine according to claim 14, characterized in that each said handling system (08) is configured as a robot that can be moved by means of the relevant drive (09).

17. The processing machine according to claim 14, characterized in that the sequence of respective movements to be executed along the respective paths of movement of the plurality of handling systems (08) located within the same working space (01) is executed dependent upon the specified processing procedure and/or upon the selected processing stations (02; 03; 04; 06).

18. The processing machine according to claim 14, characterized in that the respective movements to be executed along the respective paths of movement of said plurality of handling systems (08) located within the same working space (01), controlled by the control system (11), are controlled in each case factoring in a phase shift between cyclically executed movement sequences of different handling systems (08) and/or waiting times and/or acceleration times or deceleration times within these movement sequences of the handling systems (08).

19. The processing machine according to claim 14, characterized in that the respective movements to be executed along the paths of movement of the plurality of handling systems (08) located within the same working space (01) are optimized with respect to mass throughput and/or with respect to a low-vibration execution and/or a smoothly running execution of the respective run, factoring in the specified processing procedure.

20. The processing machine according to claim 12, characterized in that a selection of the processing stations (02; 03; 04; 06) is made by means of the control system (11) on the basis of the processing procedure to be carried out.

21. The processing machine according to claim 20, characterized in that the selection of processing stations (02; 03; 04; 06) made on the basis of the processing procedure to be carried out reduces the number of processing stations (02; 03; 04; 06) to be deployed to a subset of the plurality of processing stations (02; 03; 04; 06) located within the same working space (01).

22. The processing machine according to claim 12, characterized in that a selection of at least two processing stations (02; 03; 04; 06) from the set of existing processing stations (02; 03; 04; 06) is deployed by the control system (11) based upon the processing procedure to be carried out.

23. The processing machine according to claim 12, characterized in that the control system (11) moves the handling systems (08) only up to those processing stations (02; 03; 04; 06) that have been selected.

24. The processing machine according to claim 12, characterized in that the control system (11) is connected in terms of data communication to a production planning system (21), wherein the production planning system (21) specifies to the control system (11) which processing procedure is to be carried out.

25. The processing machine according to claim 24, characterized in that a production data recording device for recording a production outcome is provided, wherein the production data recording device reports actual data relating to the recorded production outcome to the production planning system (21).

26. The processing machine according to claim 1, characterized in that each of the handling systems (08) is configured as a two-axis system which is movable within a vertical transport plane.

27. The processing machine according to claim 1, characterized in that each handling system (08) feeds a relevant article (07), within the vertical transport plane of said handling system, beginning from a transfer station located in the area where the article (07) to be processed is transferred into the working space (01) to the respective processing station (02; 03; 04; 06) determined by the selected processing procedure, and then removes said article (07), which has been processed in the processing station (02; 03; 04; 06) in question, from said processing station (02; 03; 04; 06) and conveys it to the transfer station located in the area where the processed article (07) will be transferred out of the working space (01).

28. The processing machine according to claim 1, characterized in that each handling system (08) is configured to transport only one article (07) at a time.

29. The processing machine according to claim 1, characterized in that it is provided that each handling system (08) involved in a specified processing procedure feeds the respective articles (07) to be processed, one after another, to the processing stations (02; 03; 04; 06) selected for the processing procedure in question.

30. The processing machine according to claim 1, characterized in that the respective active zones of the handling systems (08) involved in the specified processing procedure are separated from one another spatially.

31. The processing machine according to claim 1, characterized in that a plurality of vertical transport planes are arranged parallel to one another and spaced horizontally from one another within the working space (01), wherein at least one handling system (08) is located in each of these vertical transport planes.

32. The processing machine according to claim 31, characterized in that the handling systems (08) acting in different transport planes are or at least can be operated independently of one another.

33. The processing machine according to claim 1, characterized in that it is configured as a printing machine or includes at least one printing machine.

* * * * *